United States Patent [19]

Ostarly

[11] 4,449,324

[45] May 22, 1984

[54] WIND VANE HANGING PLANT CONTAINER

[76] Inventor: Adam R. Ostarly, Rte. 1, Box 651F, Covington, La. 70433

[21] Appl. No.: 412,606

[22] Filed: Aug. 30, 1982

[51] Int. Cl.³ ............................................. A01G 9/02
[52] U.S. Cl. ............................................ 47/67; 47/66
[58] Field of Search ................ 47/67, 66, 70, 71, 65, 47/39; 248/318, 323, 339, 342; D6/113, 137; D11/148, 152; 411/340, 190, 191; 16/94 R, 6 94D, 90, 91, 92, 96 R

[56] References Cited

U.S. PATENT DOCUMENTS

| D. 256,107 | 7/1980 | Mitchener | D11/152 |
| 1,360,880 | 11/1920 | Buchholtz | 411/340 |
| 2,732,954 | 1/1956 | Janonis et al. | 47/66 |
| 3,944,186 | 3/1976 | Einhorn et al. | 47/67 |

FOREIGN PATENT DOCUMENTS 296002 4/1964 Netherlands ........................ 47/65

Primary Examiner—Robert A. Hafer
Assistant Examiner—Bradley M. Lewis
Attorney, Agent, or Firm—Keaty & Keaty

[57] ABSTRACT

A hanging planter having a support arm rigidly attached to the bottom of the container at its bottom portion, a medial portion attached to the sidewall of the container and an upper portion comprising a windvane-like support arm to limit rotational movement of the container to 90°.

19 Claims, 6 Drawing Figures

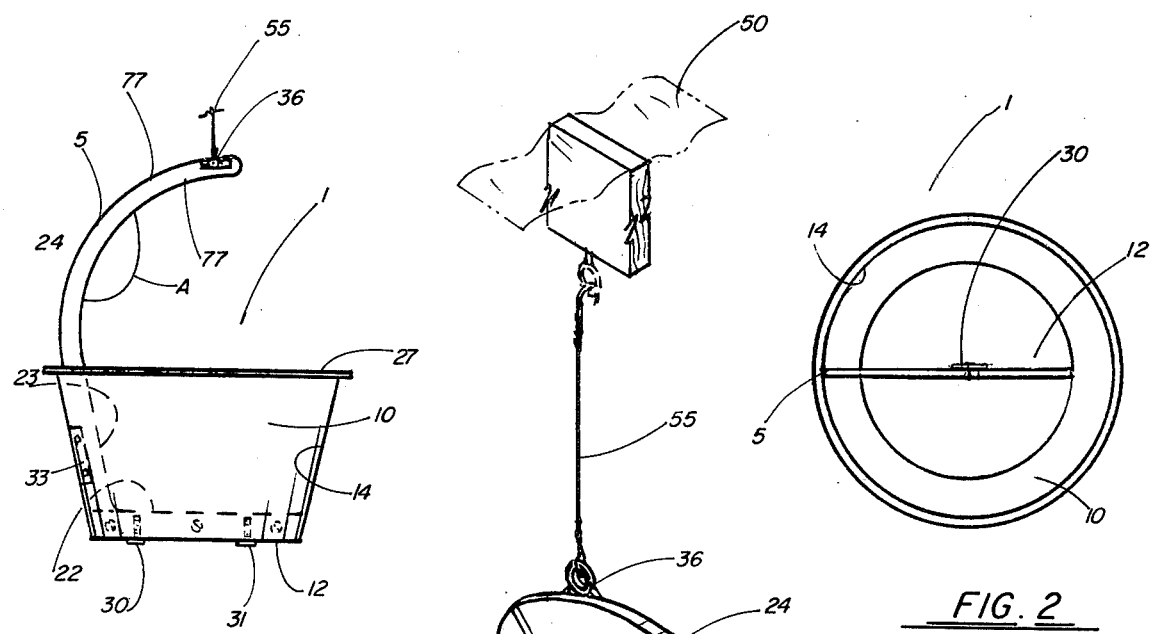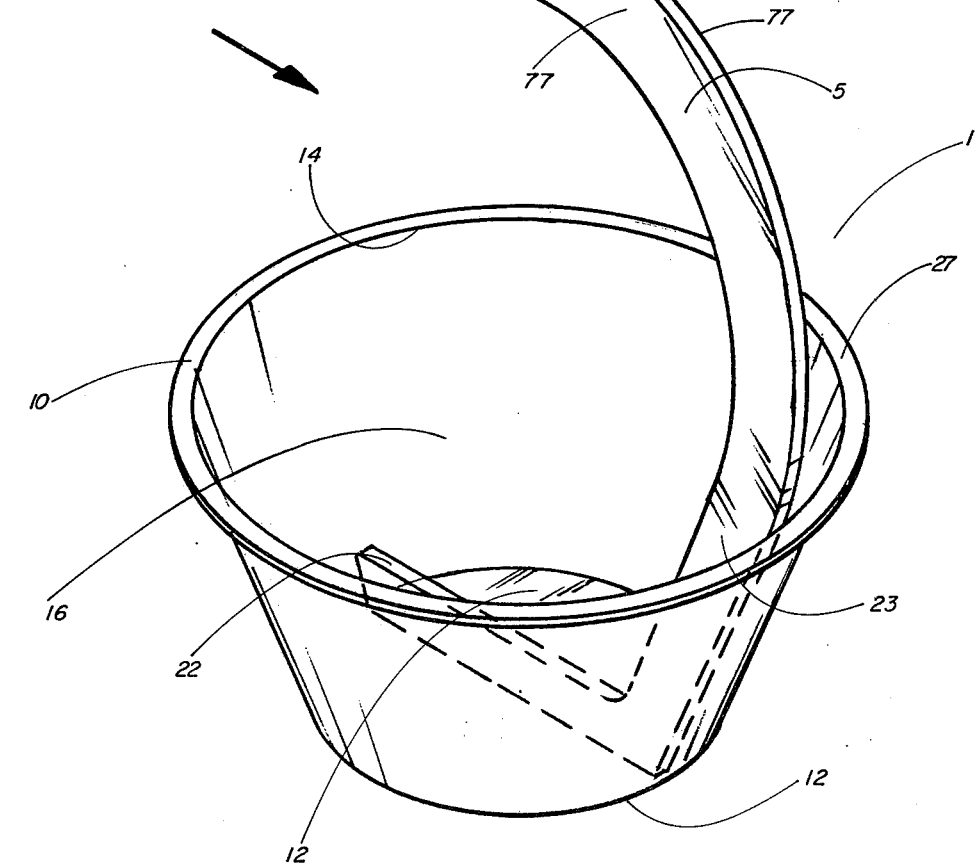

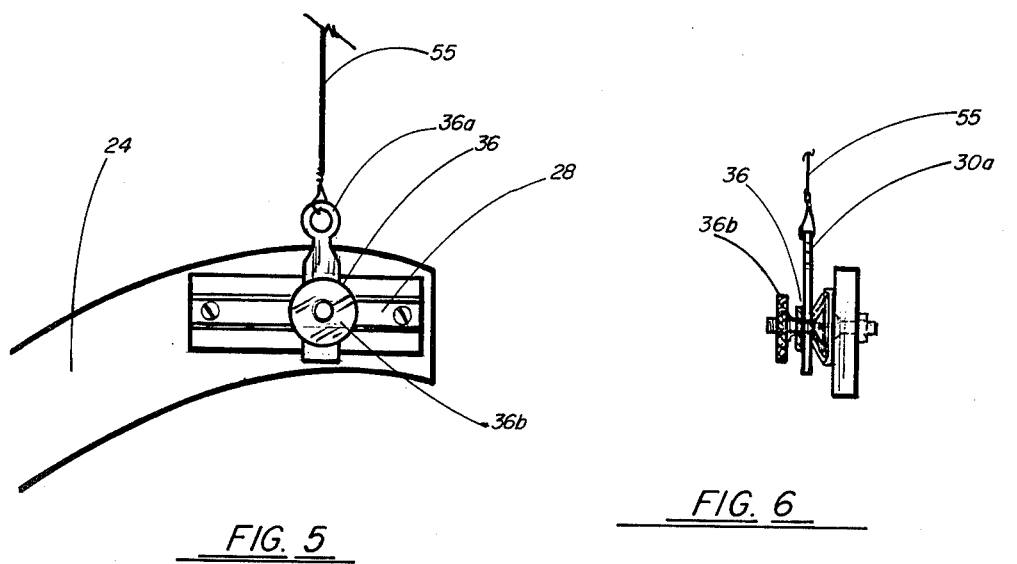
FIG. 5
FIG. 6
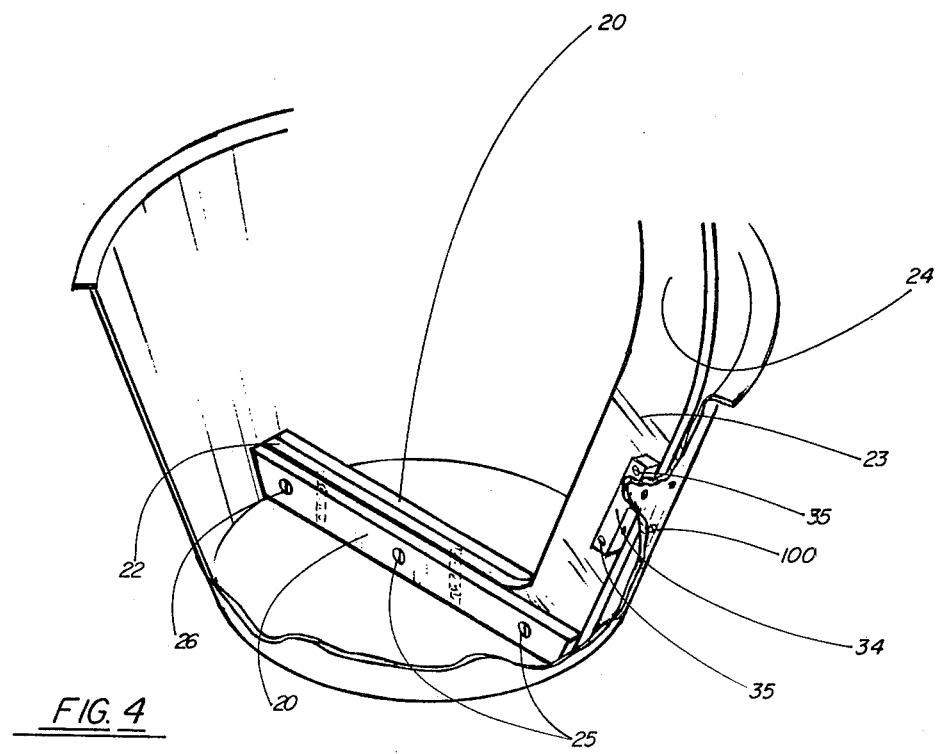
FIG. 4

WIND VANE HANGING PLANT CONTAINER

BACKGROUND OF THE INVENTION

Field of the Invention

The present invention relates to a plant container and, more particularly, to an improved hanging pot construction for flowers, plants, and the like.

The hanging planter apparatus of the present invention is provided with a support arm rigidly attached to the bottom of the container at its bottom portion, to the sidewall of the container at its medial portion and extending above the container at its top portion. The bottom portion is screwed or glued near the center of gravity of the container, the medial portion which extends along the sidewall of the container is attached by screws or glued to the sidewall at the point where the highest tension is applied, i.e., near the upper part of the container wall. The upper portion is made relatively wide in its vertical plane and narrow in its horizontal plane, so that when the wind hits the face of the top portion, the container turns 90° and the line of the windforce becomes parallel to the face of the top portion, thereby preventing any further rotational movement of the container. The top portion is disposed at about 45° angle in a relation to the medial portion and is inclined inwardly and upwardly to the center of the container. The top portion is provided with adjustable hanging means, which will be described in detail hereinafter, for suspending the container from any overhead structure.

As will become apparent from the detailed description of the invention, any number of similar support arms can be mounted equidistantly along the periphery of the container so that to further inhibit the undesirable rotation of the container. In this case, the windforce will be distributed among the plurality of the support arms, thereby preventing the lines of force of the wind from hitting the face of any particular support arm at 90° angle.

GENERAL DISCUSSION OF THE PRESENT INVENTION

It is an object of the present invention to provide an improved hanging flower pot construction for use in greenhouses, as well as in homes, to contain plants and flowers during their growth.

It is another object of the present invention to provide a plant container which is hung by means of a support arm which acts as a wind vane to substantially inhibit undesirable rotational movement of the pot.

It is a further object of the present invention to provide a hanging container construction for plants which facilitates the maximum and proper growth of the plants and flowers, as well as permitting an aesthetically attractive arangement of such container for the display of plants and flowers.

It is another object of the present invention to provide an improved hanging plant container having a wind vane-like support arm(s) having an adjustable screw hook for selectively hanging said hanging plant container at the leverage point which maintains said hanging plant container on an even plane, or balanced state.

It is another object of the present invention to provide a hanging plant container which is simple and inexpensive.

The above as well as other objects of the present invention will become more apparent and the invention will be better understood from the following detailed description of the preferred embodiments of the invention, when taken together with the accompanying drawings, in which:

BRIEF DESCRIPTION OF THE DRAWINGS

FIG. 1 is an isometric view of one embodiment of the present invention.

FIG. 2 is a top view of the present invention.

FIG. 3 is a cross-sectional, side, elevational view of the present invention.

FIG. 4 is a cut-away, partial isometric view of the preferred embodiment of the present invention.

FIG. 5 is a frontal view of the adjustable screw hook of the present invention.

FIG. 6 is a side view of the adjustable screw hook of the present invention.

DETAILED DESCRIPTION OF THE PREFERRED EMBODIMENTS

Referring more particularly to the drawings, in the preferred embodiment shown in FIGS. 1 and 2, the plant container of the present invention comprises a pot 10 having bottom 12 and side walls 14 defining an open cavity 16 for containing planting soil, dirt, or the like. As seen in FIG. 2, the pot is generally circular in horizontal section. The present invention features one or more wind vane-like hanging support arms 5 for facilitating the suspension of pot 10 from any suitable perch, for example, the roof 50 of a greenhouse, wherein support arms 5 are mounted to pot 10 along the bottom 12 and side walls 14 in a manner which will hereinafter be seen. Wind vane-like support arm(s) 5 may be constructed of any suitable sturdy material, for example, high-impact plastic. Wind vane-like support arms 5 comprise a bottom base portion 22 attached to bottom 12 of pot 10 at least near the center (of gravity) thereof, in any of several ways as will hereinafter be discussed, thereby preventing tiliting of pot 10; a medial, upright portion 23, mounted alongside side wall 14 of pot 10; and a top arm portion 24 extending inwardly to at least near the midpoint of the diameter of the upper periphery 27 of pot 10, wherein top arm portion 24 comprises a slot 28 from at least near its outer end to a point substantially inwardly therefrom, thereby providing a track for adjustable tightening and eye support to travel back and forth, for reasons which will hereinafter be seen.

In the preferred embodiment, top arm portion 24 is disposed at a suitable angle, as depicted by the letter "A" in FIG. 3, to medial portion 23 of support arm 5, shown as approximately 45° in FIG. 3, thereby preventing inhibition of plant growth and also enhancing the aesthetic attractiveness of the hanging plant arrangement, denoted generally by the numeral 1.

In the embodiment shown in FIG. 4, upright reinforcement plates 20 are attached to either side of the bottom base portion 22 of vane-like hanging support arm 5 by means of bolts 25, 26, for example, although it is to be understood that any suitable binding agent, for example, epoxy, may be employed to effect this attachment.

As also seen in FIG. 3, reinforcement plates 20, and bottom base portion 22 are attached to bottom 12 of pot 10 by means of bolts 30, 31, for example, although it is to be understood that any suitable binding agent, for example, epoxy, may be employed to effect this attachment. Alternatively, either plates 20 or bottom arm portion 22 may be integrally formed with bottom 12 of pot 10, or both plates 20 and bottom base portion 22 may be integrally formed therewith, as is depicted in FIG. 4. Medial portion 23 may be bonded to side wall 14 by means of any suitable binding substance, for example, epoxy, or may be attached by means of any other suitable attachment means, for example, bolts or screws (not shown). In the embodiments shown in FIGS. 3 and 4, support blocks 33, 34 are mounted to side wall 14 of pot 10 immediately adjacent to either side of medial portion 23, preferably near the top thereof, by means of screws 35, for example, thereby preventing undesirable lateral movement of medial portion 23, thereby ensuring stability of support arm 5, for obvious reasons, which will hereinafter be fully discussed.

Many other alternative means for securing vane-like hanging support arm(s) 5 to the bottom 12 and side walls 14 of pot 10 will become readily apparent to those skilled in the art.

Further, vane-like hanging support arm(s) 5 may be secured to the exterior bottom and side walls of pot 10 in any suitable manner, rather than to the interior walls and bottom thereof.

In the preferred embodiment, support arm(s) 5 is (are) cut from a sheet of transparent plexiglas material, although support arm(s) 5 need not be a single, integral member, and need not be made of plexiglas, as any material having sufficient strength and durability may be employed.

The hanging planter of the present invention works in the following simple manner:

1. A cable 55, which can be a string, rope, rod, or any other suitable device, is attached on one end to hook eye support 36A adjustable screw and eye support means 36 of top arm portion 24 and on its other end to any elevated structure, for example, roof 50 of greenhouse thereby suspending pot 10 and the planting soil and plant (not shown) therein contained therefrom;

2. Adjustable tightening screw and eye support means 36 is loosened and moved into the position in slot 28 of top arm portion 24 which causes pot 10 to be in a balanced condition (i.e. the center of gravity of pot 10 varies with the weight distribution of the plant and potting material contained therein), or in an even plane, so that bottom 12 is substantially parallel to the ground, and then adjustable tightening screw 36B is tightened, thereby ensuring that pot 10 does not tilt, which tilted condition may cause a spillage of planting soil or whatever potting material is used, which could ultimately destroy the plant contained therein; also, a tilted pot is not as aesthetically attractive as an evenly-keeled pot. Further, a tilted pot may cause the plant to grow in a crooked manner, which is usually undesirable;

3. Top arm portion 24 of support arm(s) 5, which is preferably disposed at an approximately 45° angle to medial portion 23, acts much as a wind vane does by preventing excessive rotational movement of pot 10 which may be caused by excessive winds or other atmospheric turbulence. Since the maximum force which can be applied to top arm portion 24 is a wind which directly hits top arm portion 24 at either face 77 thereof (i.e. the lines of force of the wind hitting face 77 of top arm portion 24 at a right angle thereto), the maximum rotation of pot 10 allowed by support arm 5 is 90° since after pot 10 is turned 90°, the lines of force of the wind become parallel to faces 77 of top arm portion 24, thereby causing a net resultant force of 0 (zero to be applied thereto, thereby prohibiting any further rotation of pot 10;

4. furthermore, any number of other support arms similar to support arm 5 may be mounted in any suitable configuration about the periphery, either inner or outer, of pot 10, whereby the extent of rotational movement of pot 10 is even further inhibited due to the fact that the lines of force of the wind are severed by the various support arms employed, thereby preventing any single support arm from absorbing the entire force of the wind; that is, the wind force is distributed amongst the various support arms employed, thereby preventing the lines of force of the wind from hitting the face of any single support arm at a 90° angle, thereby ultimately preventing a 90° rotation of the pot. As an extreme example, if 360 support arms made in accordance with the present invention are mounted equidistantly from each other about either the inner or outer periphery of pot 10, each arm 5 being mounted thereto in the manner aforedescribed, then the maximum degree of rotation of pot 10 would be 1°, since the lines of force of the wind, regardless of direction of flow, would be split into 360 sub-component lines of force which would hit the face of each support arm at a 1° angle thereto.

Thus, it can be seen from the illustrative embodiments of the present invention herein shown and described, that the hanging plant container with wind-vane like support arm(s) of the present invention provides a unique arrangement for containing plants and/or flowers, wherein the support arms act as a wind vane by inhibiting undesirable rotational movement of the pot, and wherein an adjustable screw hook is employed to facilitate the hanging of the pot at a leverage point which prevents undesirable tilting of the pot, all in a manner which provides an aesthetically attractive arrangement and which fosters the maximum, proper growth of the plant(s) and/or flower(s).

However, those skilled in the relevant art will find many variations and modifications of the present invention without departing from the spirit of the invention as is defined in the following appended claims.

What is claimed as invention is:

1. A hanging plant container, comprising:
   a. container means for holding soil and a plant, wherein said container means comprises bottom and side walls defining an open cavity;
   b. at least one support arm having an elongated bottom base portion rigidly attached to said bottom wall of said container means near the center of gravity thereof to prevent tilting of said container means; a medial portion integrally connected to said bottom base portion and rigidly attached to said side wall of said container means and extending upwardly alongside the side wall of said container means beyond the top thereof, said medial portion being attached to said sidewall adjacent its upper part; a wind vane-like top portion, integrally connected to said medial portion and extending at approximately 45° angle from the top of said medial portion inwardly and upwardly in relation to said open cavity to a point approximately above its vertical center axis, said top portion being relatively wide in its vertical plane and relatively narrow in its horizontal plane to act as a wind vane and substantially inhibit rotational movement of said container means beyond a maximum rotational arc of 90°;

c. adjustable hanging means associated with said support arm for selectively suspending said container means from any overhead structure.

2. The apparatus of claim 1, wherein said support arm is cut from a single sheet of plastic material.

3. The apparatus of claim 2, wherein said bottom base portion is integrally formed with the bottom of said pot.

4. The apparatus of claim 3, wherein it further comprises stabilization means associated with said container means for ensuring structural stability of said arm(s).

5. The apparatus of claim 4, wherein said stabilization means comprises a pair of upright reinforcement plates mounted to the bottom of said container means in attached relationship to either side of said bottom base portion for preventing lateral movement thereof, thereby helping to ensure the structural stability of said support arm(s).

6. The apparatus of claim 5, wherein said reinforcement plates are attached to either side of said bottom base portion by means of screws.

7. The apparatus of claim 6, wherein said reinforcement plates are attached to either side of said bottom base portion by means of epoxy.

8. The apparatus of claim 7, wherein said bottom base portion is separate and distinct from said container means, and is mounted thereto by means of screws.

9. The apparatus of claim 8, wherein said bottom base portion is mounted to the bottom of said container means by means of epoxy.

10. The apparatus of claim 9, wherein it further comprises support blocks mounted to the side wall of said container means immediately adjacent to either side of said medial portion, for preventing undesirable lateral movement of said medial portion, thereby ensuring stability of said support arm(s).

11. The apparatus of claim 10, wherein said support blocks are mounted to the side wall of said pot immediately adjacent to either side of said medial portion, near the top thereof.

12. The apparatus of claim 11, wherein said support blocks are mounted to the side wall of said pot, by means of screws.

13. The apparatus of claim 12, wherein said support blocks are integrally formed with the side wall of said container means.

14. The apparatus of claim 13, wherein said support blocks are mounted to the side wall of said container means by means of epoxy.

15. The apparatus of claim 14, wherein said medial portion is integrally formed with the side wall of said container means.

16. The apparatus of claim 1, wherein said adjustable hanging means comprises an elongated horizontal slot made in an uppermost part of said top portion, said slot being designed to receive an adjustable tightening sliding screw means therein, and an eye support means mounted on said tightening screw means and slidable along said slot, thereby providing a desired leverage point from which to hang said container means.

17. The apparatus of claim 1, wherein said adjustable hanging means further comprises a cable attached to said eye support means on one end and to any overhead structure on its other end, thereby hanging said container means therefrom.

18. The apparatus of claim 1, wherein said eye support means is secured to said top portion at the center of gravity of said hanging plant container means for preventing tilting of said container means, which tilting can destroy said plant.

19. The apparatus of claim 18, wherein a plurality of support arms are mounted to said container means in the same manner as described in claim 1, equidistantly from each other, thereby further inhibiting rotational movement of said container means.

* * * * *